(12) United States Patent
Sigmund et al.

(10) Patent No.: US 11,578,217 B2
(45) Date of Patent: Feb. 14, 2023

(54) WATER BASED DURABLE SUPERHYDROPHOBIC PAINT

(71) Applicant: UNIVERSITY OF FLORIDA RESEARCH FOUNDATION, INC., Gainesville, FL (US)

(72) Inventors: Wolfgang M. Sigmund, Gainesville, FL (US); Yung-Chieh Hung, Zhubei (TW); Neil Macinnes, Gainesville, FL (US)

(73) Assignee: UNIVERSITY OF FLORIDA RESEARCH FOUNDATION, Incorporated, Gainesville, FL (US)

( * ) Notice: Subject to any disclaimer, the term of this patent is extended or adjusted under 35 U.S.C. 154(b) by 618 days.

(21) Appl. No.: 16/489,463

(22) PCT Filed: Feb. 28, 2018

(86) PCT No.: PCT/US2018/020182
§ 371 (c)(1),
(2) Date: Aug. 28, 2019

(87) PCT Pub. No.: WO2018/160669
PCT Pub. Date: Sep. 7, 2018

(65) Prior Publication Data
US 2020/0347241 A1 Nov. 5, 2020

Related U.S. Application Data

(60) Provisional application No. 62/464,588, filed on Feb. 28, 2017.

(51) Int. Cl.
C09D 5/16 (2006.01)
C08K 5/05 (2006.01)
(Continued)

(52) U.S. Cl.
CPC .......... *C09D 5/1681* (2013.01); *B05D 5/083* (2013.01); *C08K 3/22* (2013.01); *C08K 3/36* (2013.01);
(Continued)

(58) Field of Classification Search
None
See application file for complete search history.

(56) References Cited

U.S. PATENT DOCUMENTS 4,030,940 A * 6/1977 Chuiko ................ C09C 1/3081
106/490
2007/0166544 A1 7/2007 Hennemann et al.
(Continued)

FOREIGN PATENT DOCUMENTS

EP 0960918 A2 1/1999
WO 2016181676 A1 11/2016

OTHER PUBLICATIONS

Lumiflon FE4400 FEVE Waterborne Resin Polyol data sheet., AGC Chemicals Amerinca, Inc. (Jan. 2014).*
(Continued)

*Primary Examiner* — Joseph D Anthony
(74) *Attorney, Agent, or Firm* — Timothy H. Van Dyke; Wolter, Van Dyke, Davis, PLLC

(57) ABSTRACT

A water based paint that can be used to form a superhydrophobic coating includes a fluorinated particulate filler, a water soluble or water suspendable resin, and an aqueous solvent. The superhydrophobic paint can be applied to a surface where the loss of the solvent results in a superhydrophobic coating.

7 Claims, 4 Drawing Sheets where X = F or Cl, $R^1$ and $R^2$ are alkyl, $R^3$ and $R^4$ are alkylene, and w, x, y, z, and n are independently 1 to 1,000

(51) Int. Cl.
    *C08K 5/06*      (2006.01)
    *C08K 9/06*      (2006.01)
    *B05D 5/08*      (2006.01)
    *C08K 3/22*      (2006.01)
    *C08K 3/36*      (2006.01)
    *C09D 127/04*    (2006.01)
    *C09D 127/12*    (2006.01)

(52) U.S. Cl.
    CPC ............... *C08K 5/05* (2013.01); *C08K 9/06* (2013.01); *C09D 127/04* (2013.01); *C09D 127/12* (2013.01); *C08K 2003/2227* (2013.01); *C08K 2003/2241* (2013.01); *C08K 2201/003* (2013.01)

(56) References Cited

U.S. PATENT DOCUMENTS

| | | | |
|---|---|---|---|
| 2008/0015298 A1* | 1/2008 | Xiong | C09D 127/12 524/451 |
| 2011/0111656 A1 | 5/2011 | Gao et al. | |
| 2012/0296029 A1 | 11/2012 | Liu et al. | |
| 2014/0238263 A1* | 8/2014 | Scheonfisch | C09D 1/00 427/427 |
| 2014/0287243 A1 | 9/2014 | Weber et al. | |
| 2018/0142129 A1* | 5/2018 | Yamamoto | C09D 201/04 |

OTHER PUBLICATIONS

PCT/US2018/020182; International Search Report and Written Opinion; dated Feb. 28, 2018; 14 pages.

* cited by examiner where X = F or Cl, $R^1$ and $R^2$ are alkyl, $R^3$ and $R^4$ are alkylene, and w, x, y, z, and n are independently 1 to 1,000

| | | |
|---|---|---|
| 55V% of fluorinated silica to Lumiflon 4400 | 152 ± 2° |  |
| 60V% of fluorinated silica to Lumiflon 4400 | 152 ± 2° |  |
| 65V% of fluorinated silica to Lumiflon 4400 | 154 ± 2° |  |
| 75V% of fluorinated silica to Lumiflon 4400 | 156 ± 2° |  |

WATER BASED DURABLE SUPERHYDROPHOBIC PAINT

CROSS-REFERENCE TO A RELATED APPLICATION

This application claims the benefit of U.S. Provisional Application Ser. No. 62/464,588, filed Feb. 28, 2017, the disclosure of which is hereby incorporated by reference in its entirety, including all figures, tables and drawings.

BACKGROUND OF INVENTION

Superhydrophobicity is defined as a material or surface with a water contact angle greater than 150 and the roll off angle or contact angle hysteresis less than 10. The coating is hard to wet by water which imparts some compelling properties like self-cleaning and antibio-fouling. Textbooks describe superhydrophobicity as depending on the surface roughness or topography. The best published phenomenon is the lotus-effect, which occurs because of the affluent tiny protrusions on the lotus or taro leaf to yield a contact angle >150° accompanied by a few degrees of roll-off angle. The second factor that is important for superhydrophobicity depends on the surface material and, typically, fluorinated compounds are employed to reduce surface energy to levels appropriate for superhydrophobicity. The most crucial criterion for superhydrophobicity is retaining the water droplet in the Cassie-Baxter state, where air pockets are trapped under the droplet to reduce the solid-liquid interface. State of the art coatings with micro-scale roughness often possess the drawbacks of poor durability and/or poor optical properties. Superhydrophobic paints, though not durable, have only been formulated as white paint, and these are organic solvent based paints. Therefore, a durable superhydrophobic surface that is scalable to coverage of a large surface remains a goal. A water based paint formulation that can be used for coating an existing structure's surface is highly desirable.

SUMMARY OF THE INVENTION

Embodiments of the invention are directed to a superhydrophobic paint that comprises functionalized metal oxide particles selected from fluorinated metal oxide particles, $C_8$ to $C_{22}$ alkylated metal oxide particles, fluorinated alkylated metal oxide particles, or any mixture thereof, a water soluble or water suspendable resin, and an aqueous solvent. The functionalized metal oxide particles can be fluorinated metal oxide particles that are $SiO_2$, $TiO_2$, or $Al_2O_3$ coated with a fluorinated alkyl silanes bonded to the surface. For example, fluorinated alkyl silane can be heptadecafluoro-1,1,2,2-tetrahydrodecyltrimethoxysilane. The functionalized metal oxide particles is 40 nm to 100 μm in diameter. The water soluble or water suspendable resin can be:

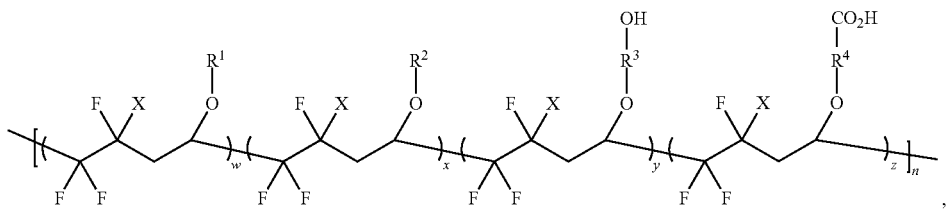

wherein X=F or Cl, $R^1$ and $R^2$ are alkyl, $R^3$ and $R^4$ are alkylene, and w, x, y, z, and n are independently 1 to 1,000. The aqueous solvent is a mixture of water and ethanol. The superhydrophobic paint can be coated on an object having a surface comprising glass, plastic, wood, or metal to form a superhydrophobic object, according to an embodiment of the invention.

An embodiment of the invention is directed to a method of preparing a superhydrophobic paint where a multiplicity of functionalized metal oxide particles selected from fluorinated metal oxide particles, $C_8$ to $C_{22}$ alkylated metal oxide particles, fluorinated alkylated metal oxide particles, or any mixture thereof, a water soluble or water suspendable resin, and an aqueous solvent are combined.

DETAILED DISCLOSURE

Embodiments of the invention are directed to water based paint formulations that result in superhydrophobic coating which are durable to wear. These coatings comprise one or more water soluble or water suspendable resins combined with fluorinated particulate filler. The fluorinated particulate filler can be a silica particle of specific surface area of 35-65 $m^2/g$, where the silica particles have a diameter of 50 to 110 nm. The silica particles are functionalized by a silane coupling agent, for example, heptadecafluoro-1,1,2,2-tetrahydrodecyltrichlorosilcane, to provide fluorinated silica particles.

Other particulate fillers that can be used alternatively or additionally to SiO$_2$ can be any metal oxide, including, but not limited to TiO$_2$, Al$_2$O$_3$, or other related ceramic powders having particles diameter of 40 nm to 100 micrometers. The particles can be functionalized with a compound to form a self-assembled monolayer or a surface specific attachment that is fluorinated for a low surface energy, where in addition to heptadecafluoro-1,1,2,2-tetrahydrodecyltrichlorosilcane, the functionalizing agent can be heptadecafluorodecyl trichlorosilane, heptadecafluoro-1,1,2,2-tetrahydrodecyltrimethoxysilane, 1H,1H,2H,2H-perfluorodecyltriethoxysilane, or other perfluoroalkyl silanes. Alternatively or additionally, octadecanoic acid, or any C8 to C22 saturated hydrocarbon acid can be used as functionalizing agent of the particles.

Figure 1:
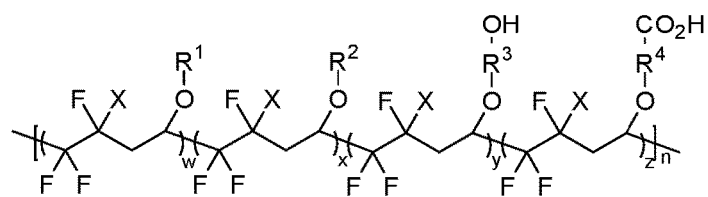
FIG. 1 shows the chemical structure of the alternating copolymer structure of the fluoropolymer that provide the enhanced hydrophobic properties of coatings from Lumiflon FE-4400 water based resin and used for the paints, according to an embodiment of the invention.

A water based resin that is water soluble or water suspendable is combined with the fluorinated filler to form the water based paint. In an exemplary embodiment of the invention, the water based resin is Lumiflon FE-4400. Lumiflon FE-4400 is a commercial water-based fluoropolymer resin emulsion used to produce coatings with high gloss and increased weatherability. The chemical structure of repeating units of the necessary fluoropolymer component of Lumiflon FE-4400 is an alternating copolymer of a fluorinated ethylene monomer and a vinyl ether monomer, as shown in FIG. 1. The fluoropolymer is about 50% by weight of the aqueous suspension. The unfilled coating from the Lumiflon FE-4400 displays a water contact angle of around 120°. Other polymers and copolymers that have fluorinated units within the backbone or as side changes that are water soluble or water suspendable can be used in conjunction with complementary components for cross-linking into a resin during drying or otherwise curing the resin after inclusion of the fluorinated particulate filler and deposition on a substrate.

Figure 2:
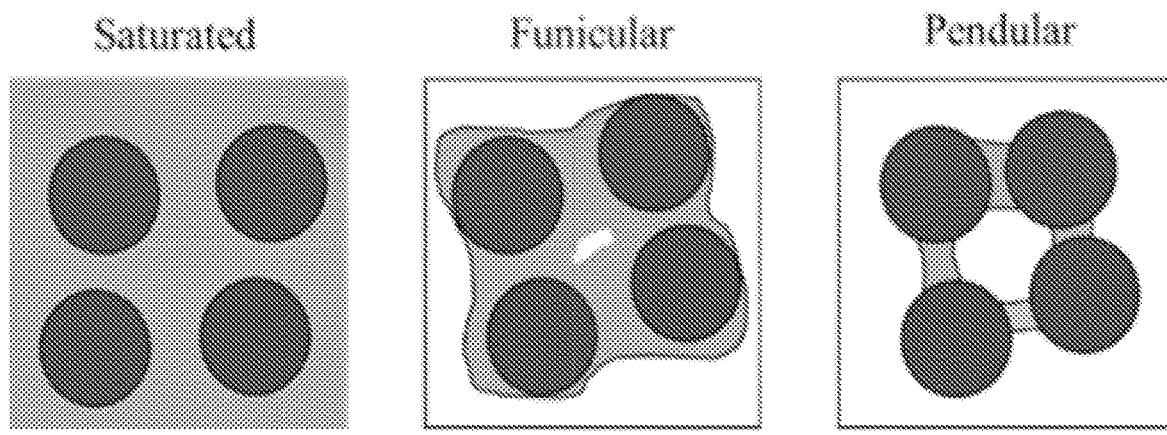
FIG. 2 shows drawings of particle-binder filler in a polymer matrix where the distribution changes from a matrix saturated to a funicular distribution to a pendular distribution with increasing volume fraction of the particle-binder in the composite.

A high volume percent of fluorinated particulate filler in the coating cause a higher contact angle and poorer wettability. The threshold between a Cassie-Baxter state and a Wenzel state occurs according to the equation:

$$\cos\theta_{trans} < f_s - 1/r - f_s$$

where $f_s$ is the contact area fraction of solid and r is the roughness factor. For these systems, $f_s$ is less than 1 and r is greater than 1, where higher roughness stabilizes a water droplet in Cassie-Baxter state, which is consistent with the observed contact angle increase with volume fraction. FIG. 2 illustrates the nature of the polymer resin's distribution within the pigment-resin composite, where a decrease of the volume percent of resin leads to a different distribution status as the surface tension and capillary force. A homogeneous resin transforms by resin adhesion on the surface of particles with the formation of pores within in the matrix to a funicular stage with the decrease in the volume percent of the resin. With an increase in the particle portion, polymer bridges form to connect particles. Therefore, with the higher volume percent pigment, resin distribution shifts from saturated to pendular with an enhanced surface roughness factor.

According to an embodiment of the invention, the paint can be applied and dried to form a coating on a substrate. The paint can be applied by spraying, rolling, brushing or any other method. The substrate can be any surface, including a glass, plastic, metal, or wood. The paint can be applied as a top coating on another coating.

The coatings from the deposited superhydrophobic paints display contact angles in excess of 150°. The proportion of fluorinated particulate filler affects the superhydrophobicity and the durability of the coating. The level of fluorinated particulate filler is at least 50% by volume relative to the water soluble or water suspendable resin, such as Lumiflon FE-4400. The fluorinated particulate filler can be 55 to 75% by volume to a mixture with the water based resin. The fluorinated particulate filler can be 55 to 65% by volume to a mixture with the water based resin. The fluorinated particulate filler can be 55 to 60% by volume to a mixture with the water based resin. The fluorinated particulate filler can be 60% by volume to a mixture with the water based resin. The resin can be used in conjunction with a water-dispersible polyisocyanate to form a cross-linked coating.

Methods and Materials

Fabrication of Superhydrophobic Fluorinated Silica Filler

Silica particles, Aerosil Ox 50, (Evonik Industries) with specific surface area is 35-65 m$^2$/g were dehydrated in an oven at 120° C. The dried silica particles were dispersed in chloroform. Heptadecafluoro-1,1,2,2-tetrahydrodecyltrichlorosilane (Gelest Inc.) was added to the silica-chloroform dispersion at 1 mL/g silica. The resulting suspension was held for 1 hour. The dispersion was centrifuged and the liquid decanted from the particles. The particles were heated to 120° C. on a hot plate for 5 hours. The fluorinated silica particles constituted a white powder.

Preparation of Coating Samples With Different Volume %

The white pigment was combined with Lumiflon FE-4400 in various proportions. Ratios of fluorinated silica to Lumiflon of 55, 60, 65, and 75 percent by volume were generated. Ethanol was added as a solvent and the resulting emulsions were mixed using a vortex mixture and subsequently stirred magnetically for at least six hours.

Sample Preparation

Soda-lime glass slides of 1"×1.5" were cleaned using isopropanol and air dried. The white pigmented fluoropolymer resin emulsions were pained on the glass the painted slides were permitted to set for a minimum of ten hours.

Method of Measurement

Contact angle measurements were determined using high resolution photos of 30 μL DI water droplets by Image J software. Durability testing was performed using a Taber 5700 linear abrader and 1200 C grit silicon carbide metallurgical paper, manufactured by ALLIED high tech products Inc., employing a loading pressure of 0.98 N. The wear index, as per ASTM D4060-14, was calculated from weight loss after every 200 cycles, up to 1000 cycles. Weight loss was measured with a TR104 Denver Instrument scale with an accuracy of 0.1 mg.

Initial Contact Angle of White Coating with Different Volume % Pigments

Figure 3:
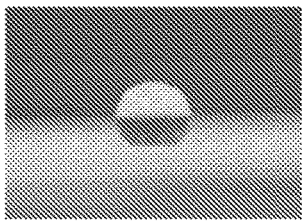
FIG. 3 shows photographic images of various formulations of the water based paints, according to an embodiment of the invention, where an increase of contact angle accompanies an increase of fluorinated silica content.
Figure 3:
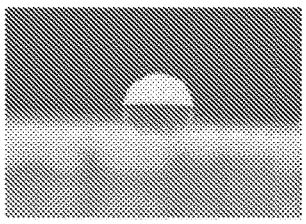
Figure 3:
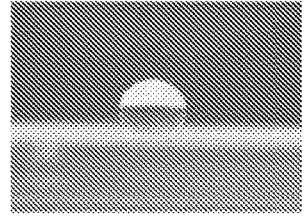
Figure 3:
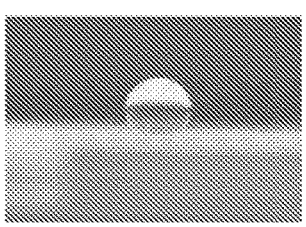

As the ratio of fluorinated fumed silica in the emulsion was adjusted from 55 to 75 volume %, the contact angle displayed a moderate increase, as shown in In FIG. 3.

Abrasion Test for the White Paint System

Figure 4:
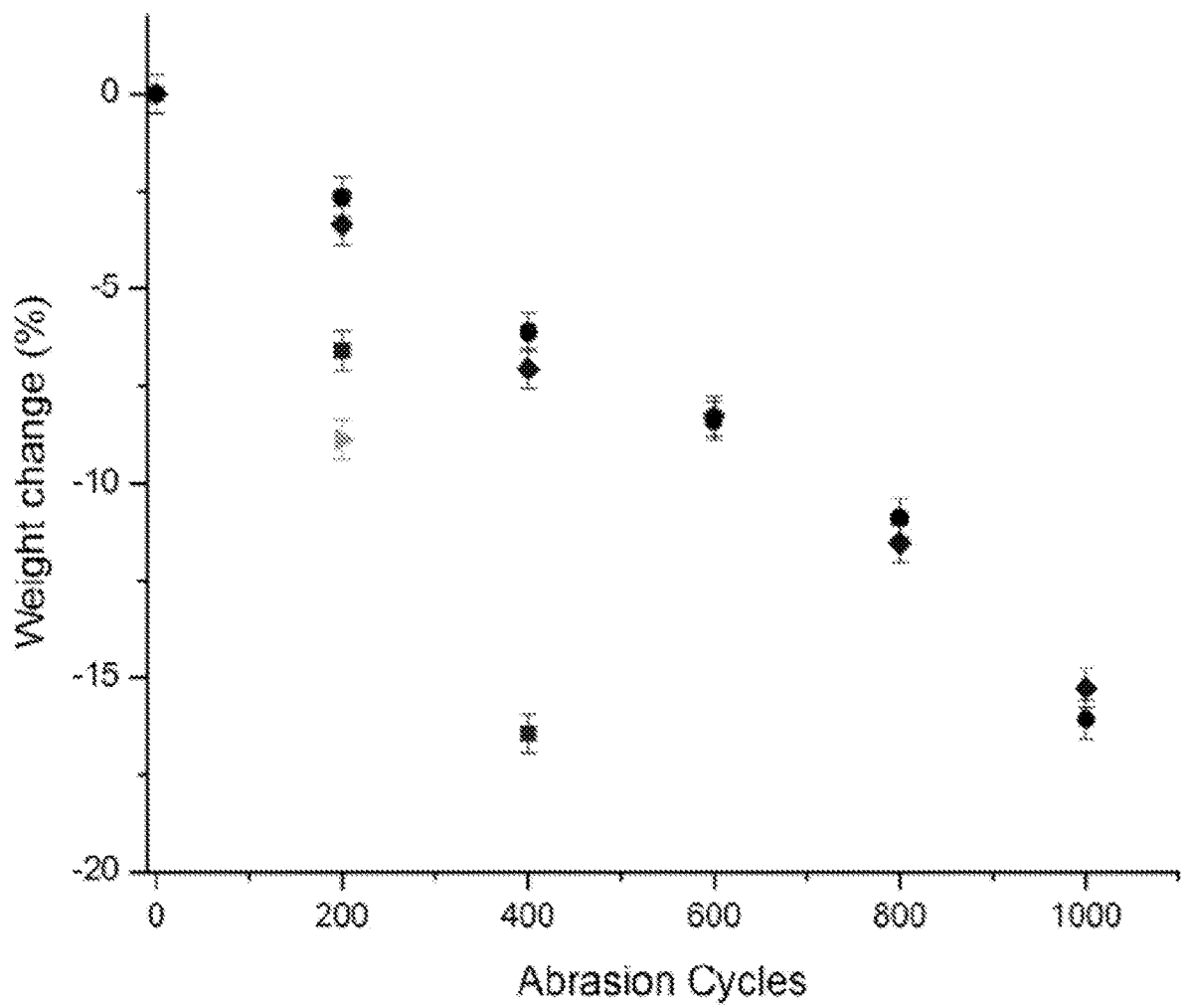
FIG. 4 a plot of the weight change against abrasion cycles for a Lumiflon white paint formulation, according to an embodiment of the invention, with various volume fractions of fluorinated silica polymer binder (▶: 75V %, ■: 65V %, ♦: 60 V %, ●: 55V %).
Figure 5:
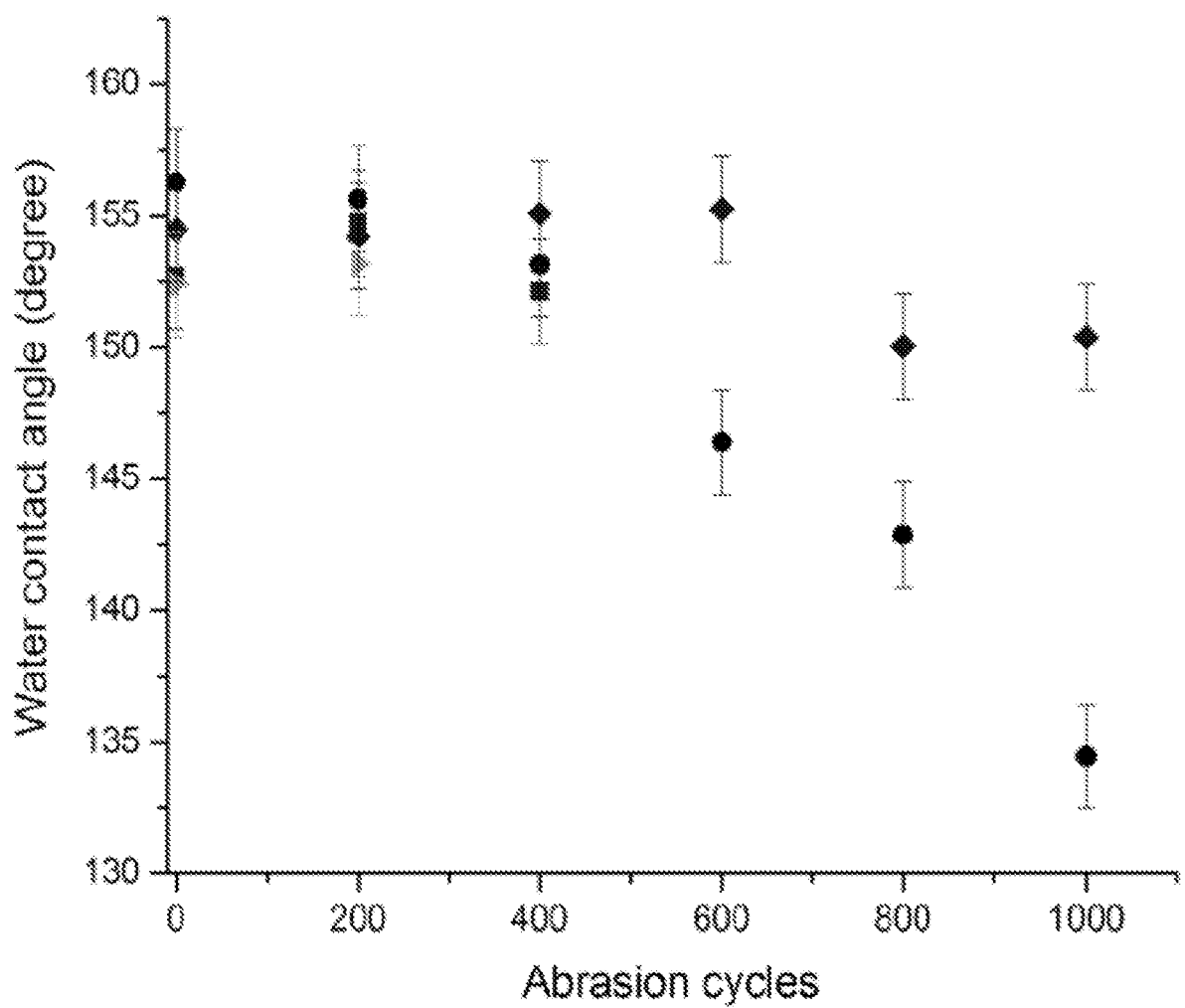
FIG. 5 shows a plot of the water contact angle against abrasion cycles for a Lumiflon white paint formulation, according to an embodiment of the invention, with various volume fractions of fluorinated silica polymer binder (▶: 75V %, ■: 65V %, ♦: 60 V %, ●: 55V %).

Abrasion testing conducted with the Taber linear abraser displayed a weight change and a contact angle change for samples having the coating resulting from the water-based paint, according to an embodiment of the invention, as indicated in FIGS. 4 and 5, respectively. As indicated in FIG. 4 coatings from paint formulations with 75V % fluorinated silica displays a mechanically weak structure that was destroyed in less than 400 wiping cycles with 1200C sand paper. The coating formed from a paint formulation with 65V % fluorinated silica was destroyed in less than 600 cycles. The wear resistance of coatings from formulate with 60V % fluorinated silica survived after 1000 times abrasion, and displayed a contact angle of 151°±2° after 1000 abrasion cycles, as shown in FIG. 5. As the fluorinated silica content decreased, the wear resistance does not improve, as indicated for the coating from the 55V % fluorinated silica paint. Additionally, the contact angle displayed by the coating from the 55V % fluorinated silica paint drops gradually as the number of abrasion cycles increases. It appears that the sample with greater volumes of the polymer matrix, as in the case of the coatings from 60V % fluorinated silica, has similar rates of the abrasion loss of matrix and filler allowing only the top particles to be removed and expose a lower layer of particles, whereas the more continuous matrix structure of the coatings from paints with 55V % fluorinated silica lose the top layer of particles from the surface without exposing a lower layer, such that the contact angle declines towards the intrinsic contact angle of the Lumiflon resin matrix of around 120°.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A superhydrophobic paint, comprising fluorinated metal oxide particles, a water soluble or water suspendable resin, and an aqueous solvent, wherein the fluorinated metal oxide particles comprise $SiO_2$, $TiO_2$, or $Al_2O_3$ coated with a fluorinated alkyl silane bonded to the surface, wherein the water soluble or water suspendable resin comprises:

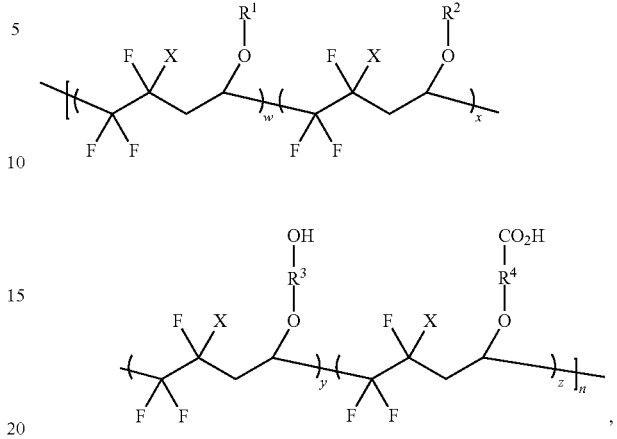

wherein X=F or Cl, $R^1$ and $R^2$ are alkyl, $R^3$ and $R^4$ are alkylene, and w, x, y, z, and n are independently 1 to 1,000, and wherein the fluorinated metal oxide particles comprise 50-75% by volume of the paint.

2. The superhydrophobic paint according to claim 1, wherein the fluorinated alkyl silane is heptadecafluoro-1,1,2,2-tetrahydrodecyltrimethoxysilane.

3. The superhydrophobic paint according to claim 1, wherein the fluorinated metal oxide particles are 40 nm to 100 μm in diameter.

4. The superhydrophobic paint according to claim 1, wherein the aqueous solvent is a mixture of water and ethanol.

5. A superhydrophobic object, comprising a coating formed by deposition of the superhydrophobic paint according to claim 1 on an object having a surface comprising glass, plastic, wood, or metal.

6. A method of preparing a superhydrophobic paint according to claim 1, comprising:
   providing a multiplicity of fluorinated metal oxide particles;
   providing a water soluble or water suspendable resin;
   providing an aqueous solvent; and
   combining the fluorinated metal oxide particles, the water soluble or water suspendable resin; and the aqueous solvent; wherein the fluorinated metal oxide particles are $SiO_2$, $TiO_2$, or $Al_2O_3$ coated with a fluorinated alkyl silane bonded to the surface, wherein the water soluble or water suspendable resin comprises:

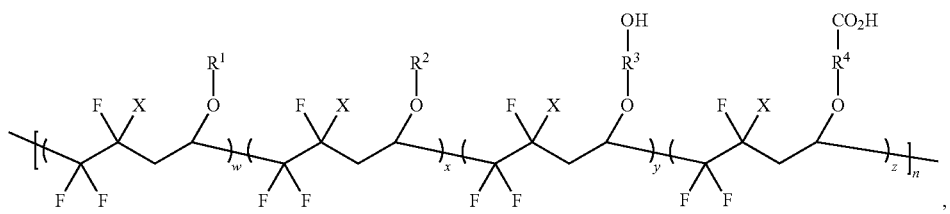

wherein X=F or Cl, $R^1$ and $R^2$ are alkyl, $R^3$ and $R^4$ are alkylene, and w, x, y, z, and n are independently 1 to 1,000, and wherein the fluorinated metal oxide particles comprise 50-75% by volume relative to the water soluble or water suspendable resin and aqueous solvent.

7. The method according to claim 6, wherein the aqueous solvent is a mixture of water and ethanol.

\* \* \* \* \*